(No Model.)

F. J. TROXELL.
HEDGE FENCE.

No. 502,058. Patented July 25, 1893.

Witnesses
C. A. Ford.
J. N. Siggers

Inventor
F. J. Troxell.

By his Attorneys,
C. A. Snow & Co.

UNITED STATES PATENT OFFICE.

FELIX J. TROXELL, OF LOCK HAVEN, PENNSYLVANIA.

HEDGE FENCE.

SPECIFICATION forming part of Letters Patent No. 502,058, dated July 25, 1893.

Application filed November 25, 1892. Serial No. 453,054. (No model.)

*To all whom it may concern:*

Be it known that I, FELIX J. TROXELL, a citizen of the United States, residing at Lock Haven, in the county of Clinton and State of Pennsylvania, have invented a new and useful Hedge Fence, of which the following is a specification.

My invention relates to improvements in hedge-fences; the objects in view being to provide a fence formed preferably of the osage-orange plant, for a securing of the same in relative position during its continued growth, whereby it assumes such position; to avoid during the period of training the plant any barking of the same or other injury or the interposition of anything liable to impede its sap; to so construct the fence as to simplify its mode of construction and render the same capable of being practiced by inexperienced or unskilled fence-builders; and finally to provide a support for the plants that shall be durable, unaffected by the weather, and congenial to the plant itself.

With these several objects in view the invention consists in certain features of construction hereinafter specified and particularly pointed out in the claims.

Figure 1:
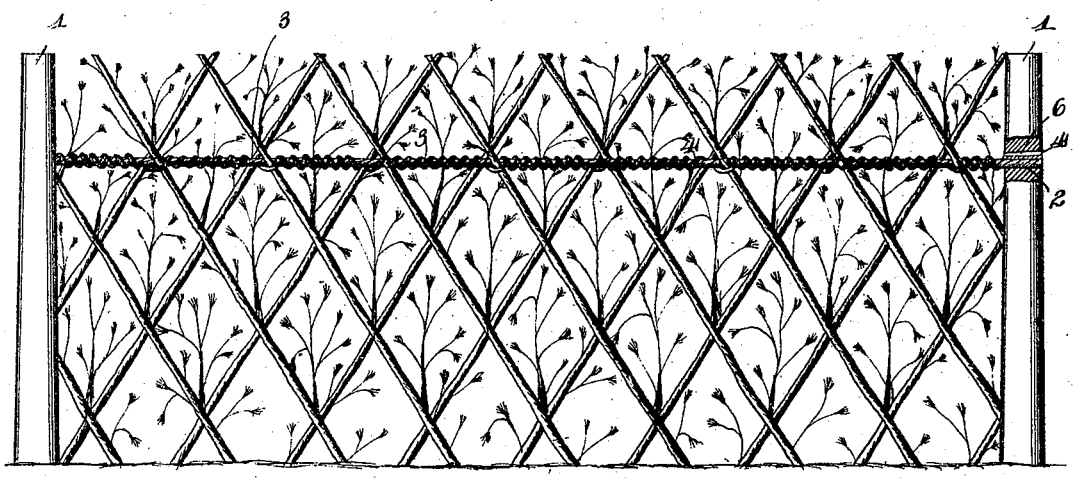
Figure 3:
Figure 2:
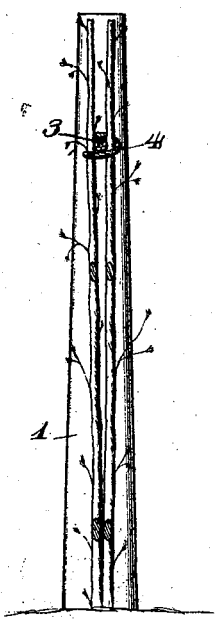

Referring to the drawings:—Figure 1 is a side elevation of a fence constructed in accordance with my invention. Fig. 2 is a transverse vertical section of the same. Fig. 3 is a horizontal section of a portion of the fence.

Like numerals of reference indicate like parts in all the figures of the drawings.

When the osage-orange plant has received sufficient growth, the same is carefully trimmed uniformly along the row the plants form, and at proper distances apart posts 1 are set. These posts are provided each with a perforation near its upper end, as indicated at 2, and a rope formed of hemp, flax, cotton, manila, jute or like vegetable substance, and prepared or treated with a coating of tar, pitch, asphaltum, bitumen, or other preservative substance, has one end secured within the opening of one post, and is then stretched taut to the opposite post where it is likewise secured. This rope I have designated as 3 and is the main support, or in fact is the support for the plants during the process of plashing. In passing the rope from one post to the other the stalks are divided, one half lying upon one side of the rope, and the other half upon the opposite side, so that the rope forms an intermediate spacing medium, that is, prevents the contact of the plants at one side with those at the opposite side of the rope. I next take a smaller or tying rope 4, which rope is formed of similar material and similarly treated as the main or supporting rope, and secure one end of this smaller rope to one post. Beginning with the first plant, or the one adjacent to the post, it is bent away from the post at an angle of about forty-five degrees, and a plant at the opposite side of the rope and located about the sixth one from the first, is bent toward the post at an angle of about forty-five degrees so that the two plants intersect each other or cross coincident with the point of crossing of the plants by the main or supporting rope. This process is carried on throughout the series of plants, and the result is that the skeleton work for the fence is formed.

It now remains to provide some means of securing the plants in their relative positions, and this I accomplish by means of the small or binding rope which is wrapped about the main or supporting rope from the post to the intersection of the first two plants, is then passed around one of the plants under the main rope to the opposite plant at the opposite side of the rope around which it is also passed, and is then wound in a reverse direction around the main rope, this process being carried on throughout the series of plants. By reason of this wrapping of the binding-rope in alternately opposite directions I avoid the necessity of handling the main coil of binding rope, and its subsequent labor and difficulty, and thus facilitate to a material degree the method of building the fence, and adapt the same to be constructed by unskilled fence-builders. The ends of both ropes take through the perforations in the posts before mentioned and there they are held securely by means of keys or plugs 6 or other devices that may preferably be employed.

The ropes being treated as described, will be possessed of great durability and not become affected by the weather; the wrapping of the binding rope around the main rope interposes between the points of crossing of the stalks or plants a spacing medium that prevents them from rising or becoming misplaced or assuming any other position than that given them at the time of building the fence; and the large or main rope that supports the plants or stalks stands between the series at opposite sides of the rope preventing them from contacting.

I am aware that wire has been used in the construction of these fences, but wire is open to many objections, prominently among which are, that it injures the bark of the plant, and being of metal might properly be said to be uncongenial to the plant or to its growth. On the other hand, rope being formed of a vegetable material or substance is naturally congenial to the plant, while at the same time it is pliable and soft, offering no hard substance against which the bark can be injured, and readily yielding to the growth of the plant.

The bending or plashing of the plants causes their upper sides to be toward the sun, which are thus nurtured by the natural tendency of the sap to rise to these upper sides, and hence the sprouting which subsequently takes place will be upon this side and the interstices or spaces bounded by the crossing or intersecting stalks will soon become filled by the foliage. In course of time the plants assume this attitude and the result is that a secure hedge-stalk fence is produced at a slight cost, with little labor, and one that possesses symmetry and uniformity throughout its length.

Having described my invention, what I claim is—

1. The herein described hedge-fence, consisting of opposite posts and an intermediate series of plants located in line and between the posts, the main rope extending from post to post and separating the plants so that a series thereof will be located at each side of the rope, said rope being taut and straight, said plants being inclined in opposite directions at opposite sides of the rope and intersecting, and spaced apart at and by the main rope, and a binding rope for securing the plants in their relative positions, upon the main rope substantially as specified.

2. The herein described hedge fence consisting of opposite posts, and an intermediate series of plants located in line and between the posts, the straight main rope extending from post to post and separating the plants so that a series thereof will be located at each side of the rope, said plants being inclined in opposite directions at opposite sides of the rope and intersecting and spaced apart at and by the main rope, and a binding rope secured to the posts and embracing each plant at its point of intersection with the main or supporting rope, and at opposite sides of said point being wound in a reverse direction, substantially as specified.

3. The herein described hedge-fence consisting of opposite posts, and an intermediate series of plants located in line and between the posts, the main rope being of a waterproof material and extending from post to post and separating the plants so that a series thereof will be located at each side of the rope, said plants being inclined in opposite directions at opposite sides of the rope and intersecting, and spaced apart at and by the main rope, and a binding rope, of a waterproof material, secured to the posts and embracing each plant at its point of intersection with the main or supporting rope, and at opposite sides of said point being wound in a reverse direction, substantially as specified.

In testimony that I claim the foregoing as my own I have hereto affixed my signature in the presence of two witnesses.

FELIX J. TROXELL.

Witnesses:
J. R. YOUNGMAN,
S. D. FURST.